3,594,147
FLOAT BATH TANK CONSTRUCTION AND
METHOD OF MAKING THE SAME
William F. Galey, Saxonburg, and John E. Sensi, Arnold,
Pa., assignors to PPG Industries, Inc.
Filed Dec. 1, 1967, Ser. No. 687,363
Int. Cl. C03b 18/02
U.S. Cl. 65—182                                         4 Claims

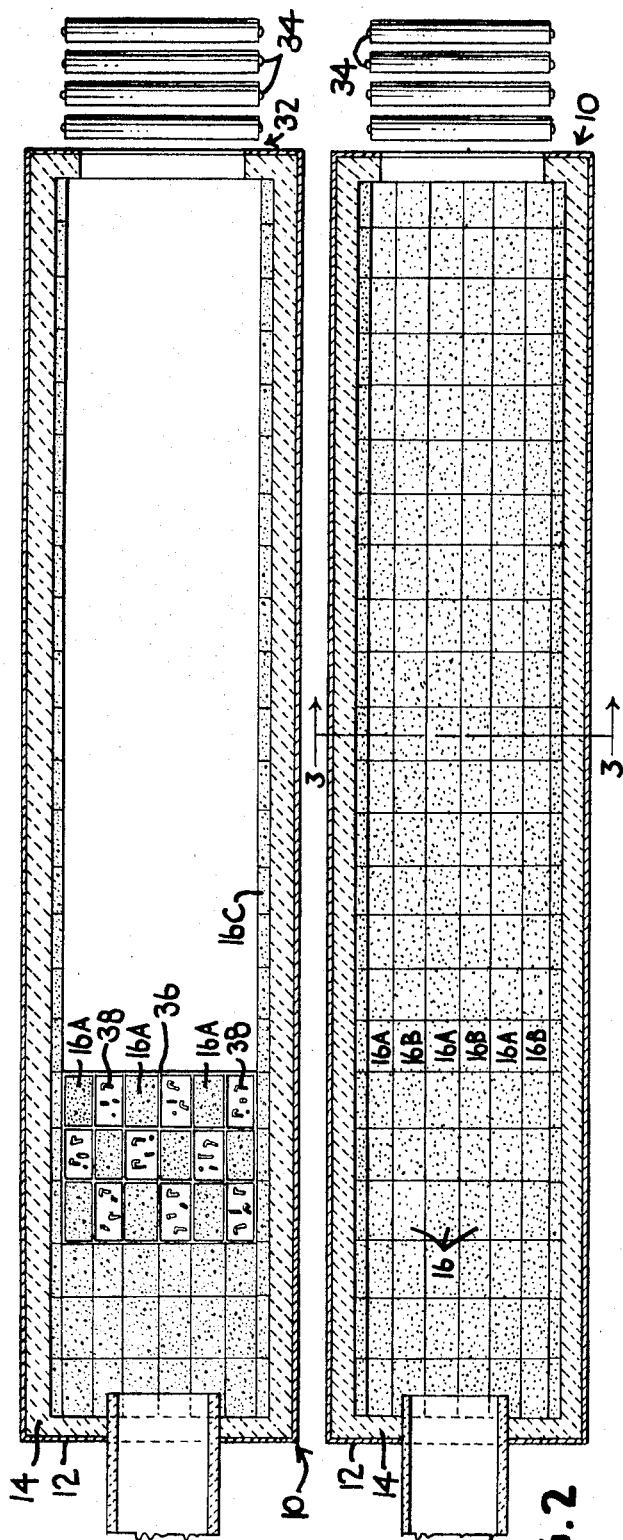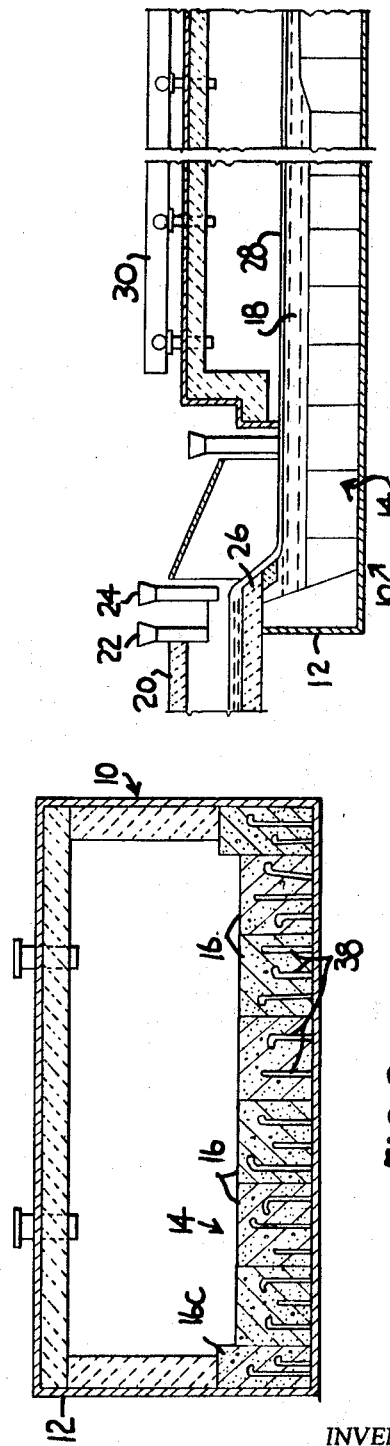

ABSTRACT OF THE DISCLOSURE

A float bath tank has a plurality of refractory lining blocks cast in situ on the bottom of the tank around metal studs which are affixed to the casing of the tank.

BACKGROUND OF THE INVENTION

In the process of manufacturing float glass as practiced today, a mass of glass is supported on a liquid bath, generally molten tin, and the glass is permitted to spread thereon and form a ribbon. The glass can be permitted to spread to its equilibrium thickness, on the order of 0.271 inch for a soda-lime-silica glass of a composition similar to that of conventional plate and sheet glass, or may be attenuated to a thickness less than its equilibrium thickness or may be controlled to form a thickness greater than its equilibrium thickness.

In any case, regardless of the glass thickness being produced the bath of molten tin is confined in an elongated tank constructed of a steel shell lined with clay refractory blocks. Because the refractory blocks will float on tin, the practice is to bolt each block to the steel shell. This is accomplished by welding heat-resisting threaded studs to the interior of the shell, drilling each refractory block, so as to provide at least one and generally two or more counterboard openings each to receive a stud generally ½ inch in diameter and 4 to 9 inches in length, a washer and nut, and then a clay refractory to close the opening. The clay refractory used to close the opening is a ramming mix and is intended to eliminate contact of the stud, washer and nut with molten tin of the bath and possible contamination of the tin. The refractory blocks are leveled on a bed of granular leveling material as for example, sand or the like.

A typical bath of, for example 150 feet in length and sufficiently wide to produce a 100-inch ribbon of glass may include approximately 450 refractory blocks of various sizes and shapes, usually varying up to 24 inches by 36 inches in length and width. The thickness of the blocks generally varies, as from 6 to 12 inches or more, depending upon their location in the tank. Generally the glass entrance end tin of a bath is deeper than the exit end depth and there are refractory side walls, such that the bath configuration is a through-like container.

Each of the separate refractory blocks is conuterbored to receive at least two studs, the larger size blocks are bored for four studs. Thus, there are more than 900 and perhaps 1400 or more studs welded to a typical steel shell, and the same number of holes to be drilled in the blocks which also must be cut to shape and eventually fitted into the shell with narrow joints therebetween. In addition, the washers and nuts are manually placed on the studs and manually tightened down. All in all, a tremendous amount of work and time is required to build such a bath. It can be readily understood that the construction alone, excluding the cost of material, is quite expensive.

SUMMARY OF THE INVENTION

In accordance with the invention, the clay refractory portions of the float bath are cast in situ. To accomplish this, a number of hooks, anchors or the like of equal or different lengths are welded to the bottom of the steel shell of the bath. While there are more than 900 threaded studs in the prior art construction, there can be the same number or a lesser number of hooks etc., which need not be threaded. A castable refractory material is cast directly against the steel and around the studs to a desired depth, no leveling material being required between the shell and blocks, as previously required. Generally it is preferred to divide the shell into a number of sections, divided by suitable forms, much in the manner of casting a concrete roadway of sizable width and length, i.e., alternate sections being cast at one time, the forms removed, and then the remainder being cast at other and different times. Any differences in thickness or surface contour can be satisfied by using properly shaped and placed forms. Because of thermal expansion of the refractory during use, joints between the cast blocks are considered desirable. Inasmuch as adjacent sections are cast against one another, one method of allowing for expansion is employ an aluminum-silicate fiber material as joint separators. Typical aluminum-silicate fibers are "Fiberfrax" manufactured by The Carborundum Company or "Kaowoll" manufactured by The Babcock & Wilcox Company.

As can be readily understood, the process of casting the refractory in situ materially reduces the costs involved in constructing a float bath because there is no drilling of blocks, no fitting of blocks, no installing of blocks with the bolting operation and, also fewer studs can be used. No threads need be provided on the studs that are used. The process lends itself to constructing a bath with fewer joints between sections and this is desirable in providing fewer baths for molten tin to penetrate to the steel of the shell and become contaminated. The cast in situ material adapts to any refractory thickness which is desired.

Curing of the refractory is a simple procedure. The bath container must be heated to a temperature well above the melting temperature of the tin, and above the melting temperature of the glass, tin melts on the order of 450° F., and the glass is maintained from approximately 2100° F. at the entrance end to about 1000° F. at the exit end. Controlled preheating is sufficient to cure the refractory, and the tin may be added when the tank has been preheated to approximately 500° F.

THE DRAWING

FIG. 1 is a plan view of a typical float bath tank showing portions of the refractory cast in situ;

FIG. 2 is a view similar to FIG. 1 showing the finished cast in situ refractory;

FIG. 3 is a section taken along line 3—3, FIG. 1 showing the studs or hooks about which the refractory is cast;

FIG. 4 is a partial longitudinal section through the glass entrance end of a float bath illustrated for purposes of description of the process.

THE PREFERRED EMBODIMENT

Referring now to the drawings, there is shown a float bath tank, generally identified as 10, which includes a steel shell 12 and a refractory lining 14. The refractory lining has a ceiling, side walls and a bottom, as shown, the bottom being constructed of a plurality of sections 16 which will be further described. The bottom is a trough-like contour to receive a body or bath of molten tin 18 (see FIG. 4) onto which a mass of glass is deposited from a melting tank 20 past a pair of refractory tweels 22, 24 which control flow, over a spout 26 onto the bath 18 to form a ribbon 28 of glass. Suitable atmosphere such as a mixture of nitrogen and hydrogen, as for example, 95% nitrogen, 5% hydrogen, is supplied through headers 30, so as to prevent oxidization of the bath and the formation of dross thereon which could adhere to the glass and make it unacceptable and of reject quality. The glass ribbon is cooled downstream on the bath, is removed from the bath at the exit end 32 of the bath tank and conveyed into an annealing lehr (not shown) on conveying rolls 34.

The bottom of the bath tank is constructed of portions or sections 16 of refractory which are cast in situ. In FIG. 1, there are shown alternate sections of cast refractory, the sections being separated by forms 36. The forms can be made of wood, metal, or other material, so long as the refractory mix does not adhere thereto.

Prior to casting the sections, a plurality of hooks, anchors or the like 38, generally of steel, are welded to the bottom of the shell 12, so as to be entirely imbedded in the cast refractory. These hooks, anchors, etc., maintain the sections 16 in position even though molten tin seeps through a joint and beneath the section, the refractory material being generally of a density less than that of the tin.

As can be seen in FIG. 1, a plurality of alternate sections 16A of refractory are cast, the cast refractory sections are permitted to set, then the forms are removed, and the remainder of the sections 16B are cast against the section 16A. Of course, not all sections 16A or 16B need be cast at the same time or on the same day. Portions can be cast and the casting progressed in one or more directions. When casting is completed, as shown in FIG. 2, the bottom is composed of a series of sections generally of similar size and shape. Good casting practices, such as vibrating the material, are followed. The showing of the drawings is illustrative; there may be more or fewer blocks than illustrated, depending upon the dimensions of the tank and also of the maximum section.

To cast the side blocks 16C merely requires additional forms of different heights, as can readily be understood. The side blocks can be cast with two levels by proper form design. Also the depth of the bottom sections may differ, as shown in FIG. 4, which change can be accommodated by suitable forms.

A typical castable refractory suitable for such use is manufactured by The Babcock & Wilcox Company under the tradename KAOCAST. A chemical analysis (fired basis) of KAOCAST is:

| | Percent |
|---|---|
| Silica ($SiO_2$) | 33.4 |
| Alumina ($Al_2O_3$) | 60.0 |
| Ferric oxide ($Fe_2O_3$) | 1.0 |
| Titania ($TiO_2$) | 1.9 |
| Calcia (CaO) | 3.4 |
| Magnesia (MgO) | 0.1 |
| Alkalies as ($Na_2O$) | 0.2 |

This material has a thermal conductivity of 6.66 B.t.u./ sq. ft./hr./° F. and has a use limit of 3000° F. After being cast, the bath tank is heated to an elevated temperature which cures the refractory in situ.

Other high alumina castable refractories can be used, such as B&W Kaocrete 32, B&W Kaocrete 28, B&W Kaocrete L1; these refractories containing the following percentages:

| | | Kaocrete 32 | Kaocrete 28 | Kaocrete L1 |
|---|---|---|---|---|
| Silica | $SiO_2$ | 28.4 | 39.5 | 28.5 |
| Alumina | $Al_2O_3$ | 65.8 | 50.5 | 62.7 |
| Ferric oxide | $Fe_2O_3$ | 1.0 | 3.1 | 0.9 |
| Titania | $TiO_2$ | 2.2 | 2.0 | 1.7 |
| Calcia | CaO | 2.4 | 4.7 | 5.9 |
| Magnesia | MgO | Trace | 0.1 | 0.1 |
| Alkalies as | $Na_2O$ | 0.2 | 0.1 | 0.2 |

We claim:

1. An apparatus for producing a float glass sheet on a bath of molten metal comprising an elongated metal housing, said housing having a bottom member and wall members forming a tank, a plurality of metal studs in said housing secured to and extending upwardly from said bottom member, and a plurality of cast in situ refractory block members in contact with and covering the surface of said bottom member and at least a portion of the surfaces of said wall members, said block members each having edge faces positioned so as to form joints with edge faces of adjacent blocks, at least one of said metal studs being embedded in each of said refractory block members whereby said metal studs are maintained out of contact with the molten metal employed in said tank in the production of float glass sheets.

2. The apparatus of claim 1 wherein a separator composed of aluminum-silicate fibers is positioned between opposed edge faces of said block members so as to permit said block members to expand while in contact with the molten metal employed in said tank in the production of float glass sheets.

3. A process for forming a float glass tank having a bottom and side walls, said tank being adapted to contain molten metal comprising the steps of securing a plurality of metal studs to the bottom of said tank, each stud being positioned to extend upwardly in said tank from said bottom and casting a plurality of refractory block members on said bottom to embed at least one metal stud in each said block member, said block members being cast so as to dispose each block in side-by-side relation to adjacent block members to form seams therebetween and to prevent molten metal disposed on the surface of said block members from coming into contact with the metal studs secured to the bottom of said tank.

4. A process for forming a float glass tank having a bottom and side walls, said tank being adapted to contain molten metal comprising the steps of securing a plurality of metal studs to the bottom of said tank, each stud being positioned to extend upwardly in said tank from said bottom, casting a plurality of refractory block members in spaced relation on said bottom to embed at least one metal stud in each said block member so that the edge surfaces of each block member cast is not adjacent an edge surface of another block being cast and thereafter casting a refractory block member in each space between said previously cast block members to embed the metal studs disposed in said space and to cover the surface of the bottom and at least a portion of the surfaces of the side walls of said tank with a plurality of refractory block members having opposing edge surfaces forming joints between adjacent block members and in which blocks said metal studs are embedded, said block members being cast so as to prevent molten metal disposed on the surface of said block members from coming into contact with the metal studs secured to the bottom of said tank.

References Cited

UNITED STATES PATENTS

| 2,903,876 | 9/1959 | Nannini | 52—443X |
| 2,269,445 | 1/1942 | Easter | 65—26 |
| 2,284,797 | 6/1942 | Blau et al. | 65—26 |
| 3,260,585 | 7/1966 | Javaux | 65—65A |
| 3,486,876 | 12/1969 | Augustin | 65—99A |

S. LEON BASHORE, Primary Examiner

J. B. HARDAWAY, Assistant Examiner

U.S. Cl. X.R.

52—443; 264—30